(12) United States Patent
Bachmann et al.

(10) Patent No.: US 12,330,095 B2
(45) Date of Patent: Jun. 17, 2025

(54) MULTISTAGE LIQUID DISTRIBUTOR FOR A SEPARATION DEVICE COMPRISING A DUAL-TROUGH PRE-DISTRIBUTOR

(71) Applicant: SULZER MANAGEMENT AG, Winterthur (CH)

(72) Inventors: Christian Bachmann, Ellikon an der Thur (CH); Faton Berisha, Winterthur (CH); Stefan Leuppi, Winterthur (CH)

(73) Assignee: SULZER MANAGEMENT AG, Winterthur (CH)

( * ) Notice: Subject to any disclaimer, the term of this patent is extended or adjusted under 35 U.S.C. 154(b) by 155 days.

(21) Appl. No.: 18/035,724

(22) PCT Filed: Nov. 2, 2021

(86) PCT No.: PCT/EP2021/080401
§ 371 (c)(1),
(2) Date: May 5, 2023

(87) PCT Pub. No.: WO2022/096462
PCT Pub. Date: May 12, 2022

(65) Prior Publication Data
US 2023/0405487 A1    Dec. 21, 2023

(30) Foreign Application Priority Data
Nov. 6, 2020 (EP) .................................. 20206229.5

(51) Int. Cl.
*B01D 3/00* (2006.01)
*B01D 53/18* (2006.01)
(52) U.S. Cl.
CPC ........... *B01D 3/008* (2013.01); *B01D 53/185* (2013.01)
(58) Field of Classification Search
CPC ............................... B01D 3/008; B01D 53/185
See application file for complete search history.

(56) References Cited

U.S. PATENT DOCUMENTS 5,061,407 A * 10/1991 Nutter .................. B01D 53/185
261/96
5,597,655 A    1/1997 Hausch et al.
(Continued)

FOREIGN PATENT DOCUMENTS

DE    102018002450 A1    9/2019
EP        1459793 A1    9/2004
(Continued)

OTHER PUBLICATIONS

European Search Report issued Mar. 19, 2021 in corresponding European Application No. 20206229.5.
(Continued)

*Primary Examiner* — Jonathan Miller
(74) *Attorney, Agent, or Firm* — Global IP Counselors, LLP

(57) ABSTRACT

A liquid distributor for a separation device is provided. The liquid distributor comprises at least one pre-distributor member positioned above a plurality of distributor members. The at least one pre-distributor member comprises at least two troughs each comprising a plurality of discharge openings. Each two of the at least two troughs are connected with each other, and a first trough has an overflow portion and at least one deflector attached to the overflow portion or a side wall of the first trough. A second trough has an upper edge. If a liquid level in the first trough reaches the overflow portion, the at least one deflector extends from above the upper edge of the second trough to the second trough so that liquid flows into the second trough from the first trough over the overflow portion or the side wall and the at least one deflector.

14 Claims, 4 Drawing Sheets

(56) References Cited

U.S. PATENT DOCUMENTS

| | | | | |
|---|---|---|---|---|
| 5,906,773 | A * | 5/1999 | Hausch | B01D 53/185 261/97 |
| 6,293,526 | B1 * | 9/2001 | Fischer | B01D 3/008 261/97 |
| 7,007,932 | B2 * | 3/2006 | Armstrong | B01D 3/20 261/97 |
| 7,114,709 | B2 * | 10/2006 | Ender | B01D 3/20 261/DIG. 85 |
| 7,445,199 | B2 * | 11/2008 | Monkelbaan | B01D 3/008 261/97 |
| 7,670,572 | B2 * | 3/2010 | Porscha | B01D 3/008 422/605 |
| 8,814,148 | B2 * | 8/2014 | Bachmann | B01D 3/008 261/97 |
| 9,089,787 | B2 * | 7/2015 | Nieuwoudt | B01D 3/20 |
| 9,909,824 | B2 * | 3/2018 | Nieuwoudt | B01D 3/20 |
| 2004/0195707 | A1 * | 10/2004 | Ender | B01D 3/20 261/97 |
| 2005/0017381 | A1 * | 1/2005 | Armstrong | B01D 3/326 261/97 |
| 2007/0272298 | A1 * | 11/2007 | Porscha | B01D 53/185 137/263 |
| 2008/0054502 | A1 * | 3/2008 | Monkelbaan | B01D 3/008 261/97 |
| 2010/0237518 | A1 * | 9/2010 | Bachmann | B01D 53/185 261/97 |
| 2014/0166110 | A1 * | 6/2014 | Nieuwoudt | F28F 25/04 261/23.1 |
| 2015/0330726 | A1 * | 11/2015 | Nieuwoudt | B01D 3/008 137/561 A |
| 2021/0154594 | A1 * | 5/2021 | Bachmann | B01D 53/185 |

FOREIGN PATENT DOCUMENTS

| | | |
|---|---|---|
| JP | 2000511112 A | 8/2000 |
| JP | 2001170475 A | 6/2001 |
| JP | 2016504190 A | 2/2016 |
| RU | 2131756 C1 | 6/1999 |

OTHER PUBLICATIONS

International Search Report issued Jan. 31, 2022 in corresponding International Application No. PCT/EP2021/080401.
International Preliminary Report on Patentability and Written Opinion issued May 8, 2023 in corresponding International Application No. PCT/EP2021/080401.
Russian Decision to Grant of corresponding Russian Patent Application No. 2023110459/05 dated Oct. 7, 2024.

* cited by examiner

MULTISTAGE LIQUID DISTRIBUTOR FOR A SEPARATION DEVICE COMPRISING A DUAL-TROUGH PRE-DISTRIBUTOR

CROSS-REFERENCE TO RELATED APPLICATION

This application is a U.S. National Stage application of International Application No. PCT/EP2021/080401, filed Nov. 2, 2021, which claims priority to European Application No. 20206229.5, filed Nov. 6, 2020, the contents of each of which are hereby incorporated by reference.

FIELD OF THE INVENTION

The present disclosure relates to a liquid distributor for a separation device, such as for a mass transfer column in particular for a packing column for absorption, stripping, scrubbing or distillation, or for a reactor, such as for distributing liquid above a catalyst bed of a reactor, wherein the liquid distributor comprises at least one pre-distributor member and a plurality of distributor members. The present disclosure also relates to a separation device including such a liquid distributor and to a method making use thereof.

BACKGROUND OF THE INVENTION

Separation devices, such as mass transfer columns, are employed for an intensive gas-liquid or liquid-liquid contact in a wide variety of processes, such as in particular absorption, stripping, scrubbing, distillation, extraction and the like. Distillation columns, for example, are designed to separate a specific substance from a liquid mixture comprising two or more substances by selective evaporation and condensation. For this purpose, distillation columns comprise a boiler at the bottom and a condenser at the top so that during the operation vapour rises upwardly and liquid descends so as to enable a gas-liquid contact for effecting the mass transfer between both phases. The substance with the higher boiling point will concentrate in the liquid phase, wherein the substance with the lower boiling point will concentrate in the gas phase. In order to achieve an intensive gas-liquid contact, such columns are typically filled with an internal to optimize the gas-liquid mass transfer. Examples for such an internal are trays and packings, for instance random packings and structured packings, such as in particular a packing with cross channel structure. An essential requirement for an optimal mass transfer between both phases is that liquid is uniformly distributed over the cross-section of the tray or packing, respectively. Moreover, it is further important in particular for packing columns, i.e. columns including a random or structured packing, that the liquid flows on the surface of the packing as a thin film so as to maximize the contact area and contact time between the liquid phase and the gas phase. For both aforementioned purposes, usually liquid distributors are provided at the top of the packing or each of the packing layers, respectively. Such liquid distributors are also used in certain reactors, such as for distributing liquid above a catalyst bed of a reactor.

SUMMARY

Liquid distributors usually comprise one or more pre-distributor members and a plurality of distributor members, which are arranged below the one or more pre-distributor members. Pre-distributor members are also denoted in this technical field as parting boxes. Typically, the pre-distributor members as well as the distributor members have the form of a trough comprising two side walls, two front walls and one or more bottom walls. The top surface of the trough being opposite of the one or more bottom walls can be closed by providing a top wall or can be open. The troughs of the one or more pre-distributor members each comprise a plurality of discharge openings in their bottom walls, whereas the troughs of the distributor members typically each comprise a plurality of discharge openings in their bottom walls, in their side walls or in their bottom walls as well as in their side walls. While the one or more pre-distributor members are arranged in one plane in parallel to each other, the distributor members are arranged in the plane below that of the pre-distributor members in parallel to each other, wherein the length axes of the distributor members are perpendicular to those of the pre-distributor members. The one or more pre-distributor members and the distributor members are arranged so that the discharge openings of the one or more pre-distributor members are above the open or closed top surfaces of the distributor members. The number of distributor members is much higher than that of the pre-distributor members, because each of the one or more pre-distributor members distributes liquid to a plurality, usually dozens, of distributor members. More specifically, during the operation of a liquid distributor, liquid flows through an inlet of the liquid distributor into a feed line of the one or more pre-distributor members, wherein the feed line can or cannot separate into two or more further lines, each of which leads to the one or more pre-distributor members for instance through their open or closed top surfaces. The liquid fed via the feed lines into the one or more pre-distributor members remains there for a certain residence time, before it is discharged via the discharge openings arranged in the bottom walls of the one or more pre-distributor members into the distributor members via their open or closed top surfaces. If the top surfaces of the distributor members are closed each by a top wall, the top walls comprise respective openings allowing the liquid discharged from the corresponding pre-distributor members through their discharge openings into the distributor members. Each of the distributor members distributes the liquid via its discharge openings. The liquid can be discharged directly onto the surface of the packing or packing layer, respectively, which is located closely underneath the distributor members, or the liquid can be deflected using guiding elements, before the liquid drops onto the surface of the packing or packing layer, respectively. For instance, each of the distributor members can distribute the liquid via its discharge openings in the form of jets. In order to form a thin liquid film, one or more deflectors or so-called screens, respectively, in the form of specifically formed guide walls can be arranged in front of (or ahead of, respectively) the discharge openings of the distributor members, onto which the liquid jets impinge in a specific impact angle so as to avoid at least substantially the formation of splashes of small liquid drops at the site of impact on the screen. In tendency, the impact angle of the liquid onto the screen should be small in order to avoid such a splashing. The liquid film, which is formed on the screen surface, flows down the screen surface to the lower end of the screen, which forms a drip edge, from which the liquid falls down in the form of liquid drops onto the surface of the packing or packing layer, respectively, which is located closely underneath the drip edge of the screen. Also known are respective liquid distributors, which comprise two groups of distributor members, wherein each distributor member of the first group is connected with a distributor member of the second group so that liquid flows from each of the distributor member of the first group to a distributor member of the second group, from which the liquid is discharged via their discharge openings and deflected by screens as described above.

The aforementioned liquid distributors are particularly suitable for operating ranges of 1 to 3, with the operating range being the quotient of the maximal liquid load divided by the minimal liquid load. This is due to the fact that a minimum liquid height is required in the pre-distributor members in order to assure a homogenous distribution of the liquid across the cross-section of the pre-distributor members limiting the cross-sectional area of the trough in case of low liquid flow. Furthermore, because the liquid height in the trough at a given cross-sectional area is proportional to the square of the liquid load, the upper possible liquid load in the pre-distributor members is also limited, because the possible maximal height of a pre-distributor member is restricted by the dimensions of the manway, through which the pre-distributor member has to be moved during the installation of the liquid distributor in the separation device. In order to increase the operating range, the height of a pre-distributor member can be increased correspondingly. However, then the pre-distributor member gets so heavy that it cannot be moved anymore via a person through the manway of a separation device, such as a distillation column, and installed therein. Moreover, the dimensions and in particular height of such an enlarged pre-distributor member would be too big for the manways of typical size provided in separation devices. Therefore, if a broader operating range is needed, in practice each of the one or more pre-distributor members of a liquid distributor is provided with a dividing wall extending along the length axis of the pre-distributor member so that the pre-distributor member is multistage or a two-chamber member, respectively. The dividing wall allows liquid to flow from the first chamber of the pre-distributor member over the dividing wall into the second chamber of the pre-distributor member, when a certain liquid level is reached in the first chamber. For this purpose, the dividing wall can have a lower height than the side walls of the pre-distributor member so that the dividing wall forms an overflow edge. Alternatively, the dividing wall can comprise in its upper part one or more slits, holes or differently formed openings, which allow liquid to flow from the first chamber through the overflow opening(s) into the second chamber of the pre-distributor member. Thereby, in the case of low liquid load only one chamber operates, whereas in the case of a higher liquid load both chambers operate or are filled with liquid, respectively, thus allowing the pre-distributor member to be operated over a broad operating range of 1 to up to 10. In alternative applications, each of the aforementioned pre-distribution members having a dividing wall can be operated with two different liquids, wherein the first liquid is exclusively fed via a first inlet into the first chamber of the pre-distributor member, and the second liquid is exclusively fed via a second inlet into the second chamber of the pre-distributor member. During the operation it is assured that none of both liquids flow over the dividing wall. However, the pre-distributor members with such dividing walls have several disadvantages. Firstly, the dividing wall has to be fixed in the trough of such a pre-distributor member by means of seal welding, in order to reliably ensure even over a long operation time that liquid flows from the first to the second chamber of the pre-distributor member exclusively via the overflow edge or overflow opening(s), respectively. However, seal welding leads to a significant welding heat impact and requires special welding equipment. Secondly, since such a pre-distributor member has to be moved during the installation in the mass transfer column through a manway, it is limited concerning its maximum width and maximum height, which in turn limits the upper end of the operating range. Thirdly, because such a pre-distributor member is a single piece-trough, it has a quite high weight, if it exploits the maximum possible dimensions allowed by the dimensions of the manway, which hampers its installation.

In view of this, the object underlying the present disclosure is to provide a liquid distributor for a mass transfer column, in particular for a packing column of the type comprising one or more pre-distributor members and a plurality of distributor members, wherein the one or more pre-distributor members do not need dividing walls being fixed by seal welding into the pre-distributor member(s), wherein the liquid distributor and particularly the one or more pre-distributor members can nevertheless be operated over a broad operating range and even over a broader operating range than the known seal welded multistage pre-distributor members, and wherein the one or more pre-distributor members can be nevertheless easily installed with larger dimensions than the known multistage pre-distributor members even through the manway of a typical size.

This object is satisfied in accordance with the present disclosure by providing a liquid distributor for a separation device, the liquid distributor comprising at least one pre-distributor member and a plurality of distributor members, wherein the at least one pre-distributor member is positioned above the plurality of distributor members, wherein the at least one pre-distributor member comprises at least two troughs, each of the at least two troughs comprising a plurality of discharge openings, wherein each two of the at least two troughs are connected with each other, wherein a first trough of the at least two troughs has an overflow portion and at least one deflector attached to the overflow portion or a first side wall of the first trough, wherein a second trough of the at least two troughs has an upper edge, wherein if a liquid level in the first trough reaches the overflow portion, at least one deflector attached to the overflow portion or the first side wall of the first trough extends from above the upper edge of the second trough to the second trough so that liquid flows into the second trough from the first trough over the overflow portion and the at least one deflector.

By replacing in a liquid distributor the known seal welded multistage pre-distributor member, i.e. a trough with a dividing wall being fixed along the length axis of the trough so as to divide the trough into two halves (or chambers respectively), with a pre-distributor member comprising at least two (separate) troughs, which are connected with each other, for instance with their side walls, so that liquid flows from into the second trough the first trough over the overflow portion and the at least one deflector, if the liquid level in the first trough reaches the overflow portion, the troughs no longer need to be provided with a dividing wall fixed by seal welding therein. On the contrary, it is simply necessary to connect the troughs for instance via their side walls, which can be easily achieved by screwing, riveting, clamping or any other mechanical connection method, or by simple spot welding so that no or at most minimal welding heat impact is applied and no or, if at all, only simple welding equipment is required. This is due to the fact that on account of the overflow portion and the at least one deflector connected thereto and extending into the second trough, liquid flows reliably and completely without any liquid loss from the first trough over the overflow portion and the at least one deflector into the second trough, even if there should be a small gap being present between both troughs, because the one deflector extends into the second trough and thus over the possible small gap. Furthermore, because the pre-distributor member comprises two separate troughs, which can be easily connected with each other, any of the two troughs can have the same dimensions as the whole seal welded multistage pre-distributor member of the prior art, so that the pre-distributor member of the present disclosure can have a two-fold or even higher-fold width than the conventional seal welded multistage pre-distributor member. This is due to the fact that the two, three, four or even more troughs of the pre-distributor member in accordance with the present disclosure can be separately from each other moved through the manway of the separation device and then connected therein. On account of the possibility of achieving a higher width, the pre-distributor member in accordance with the present disclosure can be designed for an even broader operating range and thus may be operated at even higher liquid loads than the known seal welded multistage pre-distributor members. Moreover, because the troughs of the pre-distributor member in accordance with the present disclosure can be separately from each other moved through the manway of the separating, they can be designed to have each a comparably low weight so as to be easily transported, wherein by combining a sufficient high number of troughs with each other to one pre-distributor member nevertheless a comparably high operating range can be covered. Thus, also the installation flexibility is improved by using the pre-distributor members in accordance with the present disclosure.

The feature, according to which at least one deflector attached to the overflow portion or the side wall of the first trough extends from above the upper edge of the second trough to the second trough means in accordance with the present disclosure that the at least one deflector extends to span at least from the overflow portion along the direction towards the adjacent second deflector and ends above the second trough above the top surface of the second trough or in the second trough in the top surface of the second trough or in the second trough below the top surface of the second trough.

Furthermore, the feature "so that liquid flows from the first trough over the overflow portion and the at least one deflector" means that the overflow portion and the deflector are so arranged that the liquid distributor is suitable to be operated so that "liquid flows from the first trough over the overflow portion and the at least one deflector". Thus, this feature does not require that such a flow is realized under any possible operation conditions, but it is sufficient that it is achievable by using appropriate operation conditions. Preferably, at least one deflector attached to the overflow portion or the side wall of the first trough extends from above the upper edge of the second trough to or above the second trough so that liquid flows from the first trough over the top surface of the overflow portion and the at least one deflector into the second trough, if the liquid level in the first trough reaches the overflow portion.

[insert paragraph number here] In accordance with the present disclosure, the at least one pre-distributor member of the liquid distributor comprises at least two troughs, each of the at least two troughs comprising a plurality of discharge openings. Preferably, at least two and more preferably all of the at least two troughs comprise each two side walls, wherein preferably two adjacent troughs of the pre-distributor member contact each other and are connected with each other via their side walls. Thus, the side walls of the two adjacent troughs, by which the two adjacent troughs contact each other and are connected with each other, are separate side walls, which can be separated from each other. Preferably, at least the side walls of the troughs contacting each other or more preferably all side walls of the troughs have at least substantially the same length and width and the troughs contacting each other are arranged so that both side walls contact each other over their whole area. Contacting means that they are close together, which does not exclude that a small gap of a few micrometer or millimeter is present. Preferably, the gap, if present, amounts from 1 µm to 50 mm, more preferably from 1 µm to 10 mm and even more preferably from 1 µm to 5 mm, wherein gap means the distance between the two side walls. As set out above, adjacent troughs can be connected with each other by screwing, riveting, clamping or any other mechanical connection method, or by simple spot welding.

In a further embodiment of the present disclosure, it is proposed the at least two and more preferably all of the at least two troughs each comprise a bottom wall, wherein the bottom wall comprises the plurality of discharge openings. Moreover, further discharge openings can be located in one or more of the side walls of the at least two troughs. Preferably, the bottom walls of at least the first and second trough are flat and are essentially aligned with each other, wherein essentially aligned with each other means that the bottom wall of the second trough is in the same plane as the bottom wall of the first trough or in a plane being not more than 10% and preferably not more than 5% of the height of the highest sidewall of the first trough below or above the plane of the bottom wall of the first trough.

In accordance with a further preferred embodiment of the present disclosure, any one of at least the first trough and of the second trough and preferably all of them has/have the form of a hollow box having two side walls, two front walls and a bottom wall being connected with each other, wherein the bottom wall has a plurality of discharge openings. All walls are fluid tightly connected with each other, so that liquid can leave the troughs only through the plurality of discharge openings. It is further preferred that the bottom walls of two adjacent troughs are at least substantially aligned with each other. The top surface being opposite to the bottom wall of each of the troughs can be closed by a top wall comprising one or more openings for feeding the liquid into the troughs or, preferably, is open. Adjacent troughs can have the same width or can have a different width.

The present disclosure is not particularly limited concerning the cross-sectional form of the troughs or hollow boxes, respectively. For instance, the hollow boxes can have, independently from each other, a square, rectangular, trapezoidal, oval, polygonal or irregular cross-section. However, good results are in particular obtained, when each hollow box has a square or rectangular cross-section.

Preferably, none of the troughs of the pre-distributor members comprises an internal dividing wall and in particular no seal welded internal dividing wall.

Concerning the form of the overflow means, the present disclosure is not particularly restricted. For example, the overflow portion can comprise one or more selected from the group consisting of overflow edges, overflow slits, overflow holes and arbitrary combinations of two or more thereof.

In accordance with a first particular preferred embodiment of the present disclosure, the overflow portion of the first trough of the pre-distributor member of the liquid distributor comprises one or more overflow edge or even consists of one or more overflow edges. This can be easily accomplished by providing the two side walls of the first trough so that one is higher than the other of the two side walls, wherein the (one) overflow edge is the upper edge of the lower side wall. Preferably, the at least one deflector being attached to the overflow edge or the side wall of the first trough extends at an angle of more than 0° to less than 900 and preferably between 30° and 60° from the lower side wall of the first trough to the second trough. In this connection, 0° corresponds to the plane through lower side wall and 90° corresponds to the plane being perpendicular to the plane of the lower side wall. Consequently, in this embodiment the first trough has a larger height than the second trough.

Good results are particularly obtained in this embodiment, when the overflow edge (i.e. preferably the upper edge of the lower side wall) is at a height corresponding to 50 to 95%, preferably 60 to 90% and more preferably 70 to 90% of height the height of the higher side wall. Moreover, it is preferred in this embodiment that the upper edge of side wall of the second trough being connected with the side wall of the first trough comprising or forming the overflow edge has about the same height than the overflow edge or 90% to less than 100% of the height of the overflow edge.

In a further development of the idea of the present disclosure, it is suggested that the first trough has one deflector, which is attached to the overflow edge or the side wall and extends over at least 50%, preferably at least 70%, more preferably at least 90%, even more preferably at least 95% and most preferably 100% of the length of the overflow edge. This reliably allows that liquid flows homogeneously over the whole width of the overflow edge from the first trough into the second trough. Depending on the width and the angle, with which the at least one deflector attached to the overflow portion or the side wall extends from above the upper edge of the second trough to the second trough, the at least one deflector ends in or above the second trough above the top surface of the second trough or in the top surface of the second trough or below the top surface of the second trough.

In accordance with an alternative variant of this embodiment, the overflow edge and the at least one deflector are formed by bending one of both side walls of the first trough so as to form an overflow edge and a deflector being integrally connected with the overflow edge and preferably extending at an angle of more than 0° to less than 90° and more preferably between 30° and 60° from the side wall to the second trough.

In accordance with a second particular preferred embodiment of the present disclosure, the overflow portion of the first trough of the pre-distributor member of the liquid distributor comprises one or more and preferably several overflow slits. The overflow slits are preferably provided in the upper part of one of the side walls of the first trough, wherein at least one deflector is attached to the overflow portion or the side wall so that liquid flowing through the overflow slits flows over the top surface of the at least one deflector, and wherein preferably the at least one deflector extends at an angle of more than 0° to less than 900 and preferably between 30° and 60° from the side wall provided with the overflow slits of the first trough to the second trough. In this embodiment, both side walls of the first trough can have the same size or a different size. For instance, the side wall of the first trough which comprises the slit(s) is lower than the other side wall.

In this embodiment, the overflow slits preferably extend from the upper edge of one of the side walls of the first trough substantially vertically downwards (i.e. the longitudinal side of the slits are oriented vertically), wherein preferably the slits extend from the upper edge of one of the side walls vertically downwards for 5 to 100 mm and more preferably for 20 to 60 mm. The upper ends of the slits can be positioned at the upper edge of the side wall so that the slits are at their top not surrounded by the side wall, or the upper ends of the slits can be positioned below the upper edge of the side wall so that the slits are completely surrounded by the side wall.

In particular in the case that the upper ends of the slits are positioned at the upper edge of the side wall so that the slits are at their top not surrounded by the side wall, the aforementioned first preferred embodiment relating to the overflow edge is combined with the second preferred embodiment relating to the overflow slits. In other words, in this variant the first trough comprises overflow slits and several overflow edges, namely those parts of the upper edge of the side wall, in which the overflow slits are present, which are interrupted by the slits. If the liquid flow is high enough, the liquid does not only flow through the overflow slits, but also over the overflow edges. That part of the side wall of the first trough, which covers the overflow edge(s) and the overflow slits, is the overflow portion.

The at least one deflector is attached in this embodiment to the overflow portion of the first trough at or below the lowermost point of all overflow slits.

In a further development of the idea of the present disclosure, it is suggested that the first trough has one deflector, which is attached to the overflow portion or the side wall and extends over at least 50%, preferably at least 70%, more preferably at least 90%, even more preferably at least 95% and most preferably 100% of the length of the side wall provided with the overflow slits of the first trough. This reliably allows that liquid flows homogeneously over the whole width of the overflow portion from the first trough into the second trough. Depending on the width and the angle, with which the at least one deflector attached to the overflow portion or the side wall extends from above the upper edge of the second trough to the second trough, the at least one deflector ends in or above the second trough above the top surface of the second trough or in the top surface of the second trough or below the top surface of the second trough.

In accordance with a third particular preferred embodiment of the present disclosure, the overflow portion of the first trough of the pre-distributor member of the liquid distributor comprises one or more and preferably several overflow openings having another form than slits, such as having a circular, oval or elliptic cross-section. The preferred features described above for the overflow slits of the second embodiment are also preferred for the overflow openings of the third embodiment.

Preferably, the at least one deflector of the first trough of the pre-distributor in accordance with the present disclosure extends from the overflow edge in the direction towards the adjacent second trough 1 to 30% and preferably 5 to 20% over the width of the second trough. The direction towards the adjacent second trough is the direction of a straight line extending perpendicular through all side walls of the first and second troughs.

Good results are in particular obtained, when the at least one deflector of the first trough extends from the overflow portion in the direction towards the adjacent second trough for 10 to 40 mm.

In accordance with a further preferred embodiment of the present disclosure, the at least one pre-distributor member of the liquid distributor comprises three troughs, each of which comprises two side walls, wherein the first trough and the second trough contact each other and are connected with each other by each one of their side walls, and the second trough and the third trough contact each other and are connected with each other by each one of their side walls, wherein each of the first trough and the second trough has an overflow portion and at least one deflector attached to the overflow portion or the side wall, wherein each of the second trough and the third trough has an upper edge, wherein at least one deflector attached to the overflow portion or the side wall of the first trough extends from above the upper edge of the second trough to the second trough so that liquid flows from the first trough over the overflow portion (preferably over the top surface of the overflow portion) and the at least one deflector into the second trough, if the liquid level in the first trough reaches the overflow portion, and wherein at least one deflector attached to the overflow portion of the second trough extends from above the upper edge of the second trough to the third trough so that liquid flows from the second trough over the overflow edge and the at least one deflector into the third trough, if the liquid level in the second trough reaches the overflow portion.

Each of the features mentioned above for the overflow portion and the at least one deflector of the first trough is also preferred for the overflow portion and the at least one deflector of the second trough. In particular, it is preferred that each of the deflectors of the first trough and of the second trough extends at an angle of more than 0° to less than 900 and preferably between 300 and 60° of the lower side wall of the respective trough.

In addition, it is preferred that the first trough has a larger height than the second trough and that the second trough has a larger height than the third trough. Height of a trough means the length of a straight line extending from the lowermost point and the uppermost point of the trough.

In accordance with a further development of the idea of the present disclosure, the pre-distributor member or, in the case of more than one pre-distributor member, at least one and more preferably all of the pre-distributor members comprise(s) four, five, six or even more troughs which are embodied and connected with each other analogous to the above described first trough, second trough and third trough.

In dependency of the diameter of the liquid distributor and the planned liquid load, it is preferred that the liquid distributor in accordance with the present disclosure comprises one to four pre-distributor members. Preferably, each of these pre-distributor members is designed as described above. If the liquid distributor comprises more than one pre-distributor member, it is preferred that all of the pre-distributor members are arranged at least substantially in parallel to each other and at least substantially in one plane. At least substantially parallel means that the longitudinal axes of adjacent troughs do not deviate from a parallel arrangement by more than 20°, preferably by not more than 10° and more preferably by not more than 5°. At least substantially in one plane means that the bottom walls of the troughs do not deviate by more than 10% of the height of the first trough from the plane spanned by the bottom wall of the first trough.

Furthermore, it is preferred that the distributor members are arranged adjacent to each other and at least substantially in one plane. At least substantially in one plane is defined for the distributor members in the same way as for the pre-distributor members.

The distributor members can be composed and arranged relative to each other as known to those skilled in the art. For instance, the distributor members can comprise a first group of distributor members being arranged at least substantially in parallel to each other, which have the form of a hollow box having two side walls, two front walls and a bottom wall being connected with each other, wherein the bottom wall and/or one of the side walls has a plurality of discharge openings. It is preferred that the hollow box has a square or rectangular cross-section, but it can in principle also have a square, rectangular, trapezoidal, oval, polygonal or irregular cross-section. The top surfaces being opposite to the bottom wall can be open or each can be closed by a top wall. Preferably, each top surface of the distributor members is arranged so that liquid flowing through the plurality of discharge openings of the at least two troughs of the at least one pre-distributor member flows through the top surface into the distributor members of the first group. Good results are in particular obtained, when the bottom walls of the distributor members of the first group are at least substantially aligned with each other. In particular, the bottom walls of the distributor members of the first group can be arranged with their length axes at least substantially perpendicular to the length axes of the pre-distributor members.

If the liquid distributor only comprises distributor members of the first group, it is preferred that the plurality of discharge openings is provided in their side walls. However, they can in addition thereto comprise a plurality of discharge openings in their bottom wall(s) or instead of those in the side walls only in their bottom wall(s). Preferably, the liquid distributor comprises for each of the distributor members at least one screen which is arranged in front of the discharge openings of the corresponding distributor member so that a liquid jet outflowing through the discharge openings of each of the distributor members impinges onto the surface of the at least one screen and is deformed thereon to thin flowing liquid films. In particular, when the liquid distributor is designed for a packing column, it is preferred that the at least one screen is arranged so that it shields the discharge openings against a gas stream flowing upwardly.

In a further development of the idea of the present disclosure, it is suggested that the at least one screen is arranged in front of the discharge openings so that in the event of a maximum outflow of liquid, the liquid jets outflowing through the discharge openings of the distributor members of the second group impinge onto the surface of the at least one screen at angles of less than 60°, preferably of less than 30° and more preferably of less than 10°. The angle is that between the direction of liquid jet outflowing through the discharge openings and the tangent at the point of the surface of the screen, where the liquid jet impinges.

Each of the at least one screen can have the shape of a sigmoidal curve in the vertical direction as well as in the jet-parallel section, wherein the sigmoidal curve is more preferably curved downwardly and/or has a largely constant curvature in the region in which the liquid jets impinge onto the surface of the at least one screen.

Preferably, the at least one screen is arranged in front of the discharge openings so that liquid jets outflowing through the discharge openings of the distributor members impinges onto the surface of the at least one screen essentially tangentially.

In accordance with an alternative embodiment of the present disclosure, the liquid distributor can comprise—in addition to the distributor members of the aforementioned first group—a second group of distributor members, which have the form of a hollow box having two side walls, two front walls and one or two bottom walls being connected with each other, wherein the bottom wall(s) and/or one of the side walls has/have a plurality of discharge openings for an outflow of liquid in the form of jets, wherein the top surface being opposite to the bottom wall is open or closed by a top wall and liquid flowing through the discharge openings of the distributor members of the first group flows through the top surface and/or through opening(s) of the top wall and/or through opening in the side walls of the distributor members of the second group into the distributor members of the second group.

Preferably, the liquid distributor comprises for each of the distributor members of the second group at least one screen which is more preferably arranged and designed as described above for the embodiment, in which the liquid distributor only comprises distributor members of the first group.

In accordance with still an alternative embodiment of the present disclosure, the liquid distributor can comprise instead of the aforementioned first and second groups of distributor members, distributor members each of which being provided with a dividing wall therein, thus separating the inner volume of the distributor member into a first and a second chamber.

The distribution chamber can be a trough as described above, i.e. a trough comprising two side walls, two front walls and a bottom wall. The dividing wall located therein is preferably not connected with any deflection members. Discharge openings are provided in the bottom wall and/or in the side walls of both chambers of each distributor member. A liquid distributor with at least one pre-distributor member in accordance with the present disclosure and one or more of these distributor members is particularly suitable to be used in a reactor for distributing one or more liquids above a catalyst bed. Such a liquid distributor is in particular suitable for being used for individual liquid phase distribution onto one or more catalyst beds of a reactor. For instance, each of the two chambers of each distributor member is filed with a different liquid, wherein both liquids are distributed separately from each other through the discharge openings of the respective chambers of each distributor member onto the catalyst bed being arranged below thereof. For a regeneration or a cleaning of the distributor members, a cleaning liquid can be fed with increased load into one of the chambers of the distributor members so that the liquid does overflow from the respective chamber into the adjacent chamber of each distributor member.

In accordance with a further aspect, the present disclosure relates to a column for mass transfer, in particular for absorption, stripping, scrubbing or distillation, wherein the column includes at least one packing and at least one above described liquid distributor. Moreover, the present disclosure relates to a reactor including one or more catalyst beds and at least one above described liquid distributor for distributing liquid above the one or more catalyst beds.

In addition, the present disclosure relates to a method for separating at least two fluids, preferably for performing an absorption, stripping, scrubbing or distillation, wherein the method is performed with at least one aforementioned column. Furthermore, the present disclosure relates to method for distributing liquid and preferably two different liquids separately from each other above one or more catalyst beds of a reactor, wherein the method is performed with at least one aforementioned reactor.

In accordance with another particular preferred embodiment of the present disclosure, the liquid distributor only comprises distributor members, which are as described above for the second group of distributor members.

BRIEF DESCRIPTION OF THE DRAWINGS

The disclosure will be explained in more detail hereinafter with reference to the drawings.

DETAILED DESCRIPTION

Figure 1:
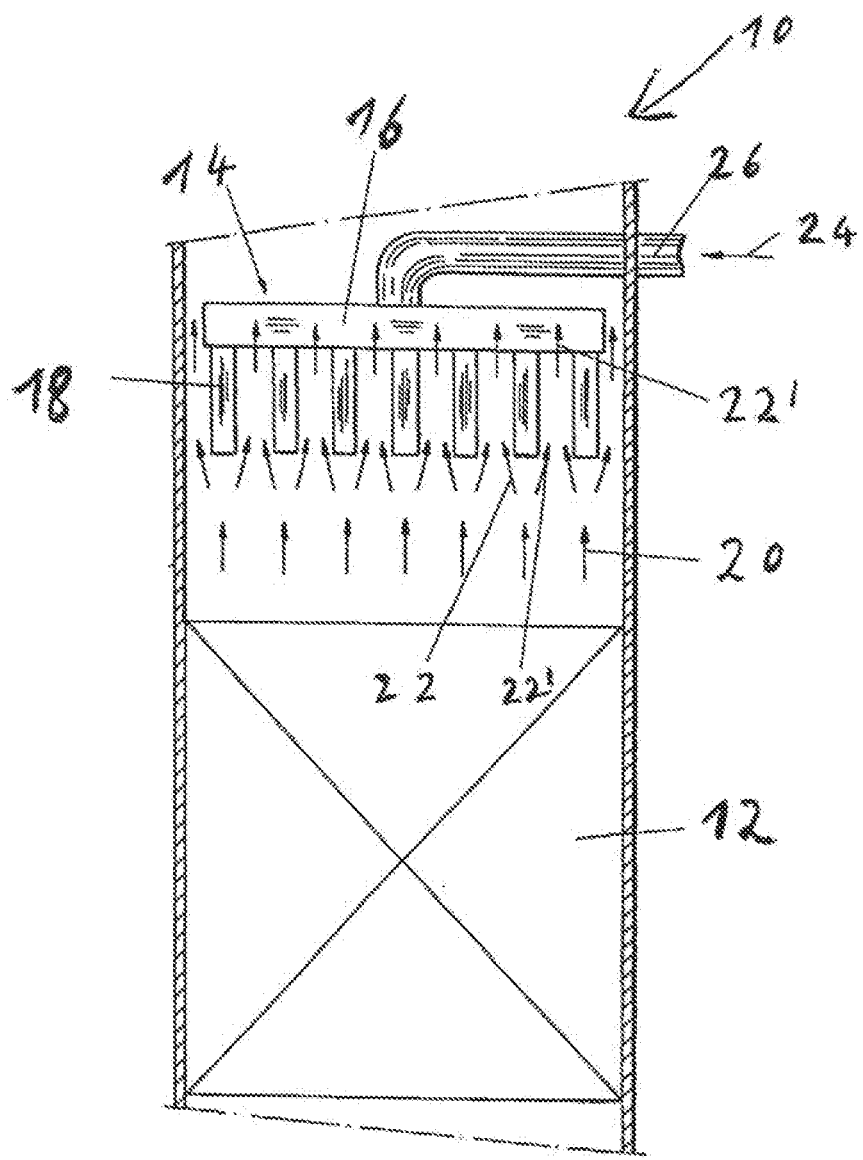
FIG. 1 is a schematic longitudinal sectional view of a mass transfer column including a packing and a liquid distributor in accordance with one embodiment of the present disclosure.

The mass transfer column 10 shown in FIG. 1 comprises a packing 12 and a liquid distributor 14. The liquid distributor 14 comprises a pre-distributor member 16 and several distributor members 18. During the operation of the mass transfer column 10, gas 20 ascends the mass transfer column 10, passes around the distributor members 18 and is divided by the distributor members 18 into a plurality of partial gas streams 22', 22. Liquid 24 is fed into the liquid distributor 14 via a feed line 26 and is guided through the pre-distributor 16 into the distributor members 18, from where it is drops down homogenously distributed onto the packing 12.

Figure 2:
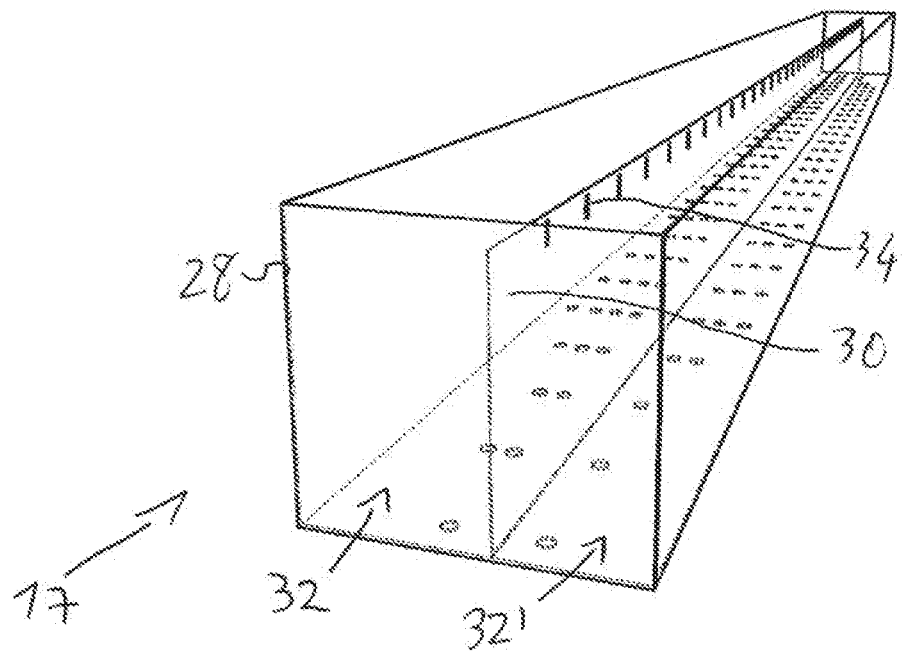
FIG. 2 is a schematic perspective view of a pre-distributor member of a conventional liquid distributor.

The pre-distributor member 17 of a conventional liquid distributor shown in FIG. 2 is composed of a trough 28 and comprises a dividing wall 30 which is fixed to the trough 28 by seal welding, which extends along the length axis of the trough 28 and which divides the trough 28 into two chambers, namely a first chamber 32 and a second chamber 32'. The dividing wall 32 comprises overflow slits 34. If the liquid level reaches in one of the chambers 32, 32' of the trough 28 the lower end of the overflow slits 34, liquid flows over the overflow slits 34 into the other chamber 32, 32' of the trough 28. This seal welded multistage pre-distributor member 17 of the prior art has several disadvantages. Firstly, the dividing wall 30 has to be fixed in the trough 28 of such a pre-distributor member 17 by means of seal welding, in order to reliably achieve even over a long operation time that liquid flows from the first chamber 32 to the second chamber 32' (or vice versa) of the pre-distributor member 17 exclusively via the overflow slits 34. However, seal welding leads to a significant welding heat impact and requires special welding equipment. Secondly, since such a pre-distributor member 17 has to be moved during the installation in the mass transfer column 10 through a manway, it is limited concerning its maximum width and maximum height, which in turn limits the upper end of the operating range. Thirdly, because such a pre-distributor member 17 is a single piece-trough, it has a quite high weight, if it exploits the maximum possible dimensions allowed by the dimensions of the manway, which hampers its installation.

Figure 3A:
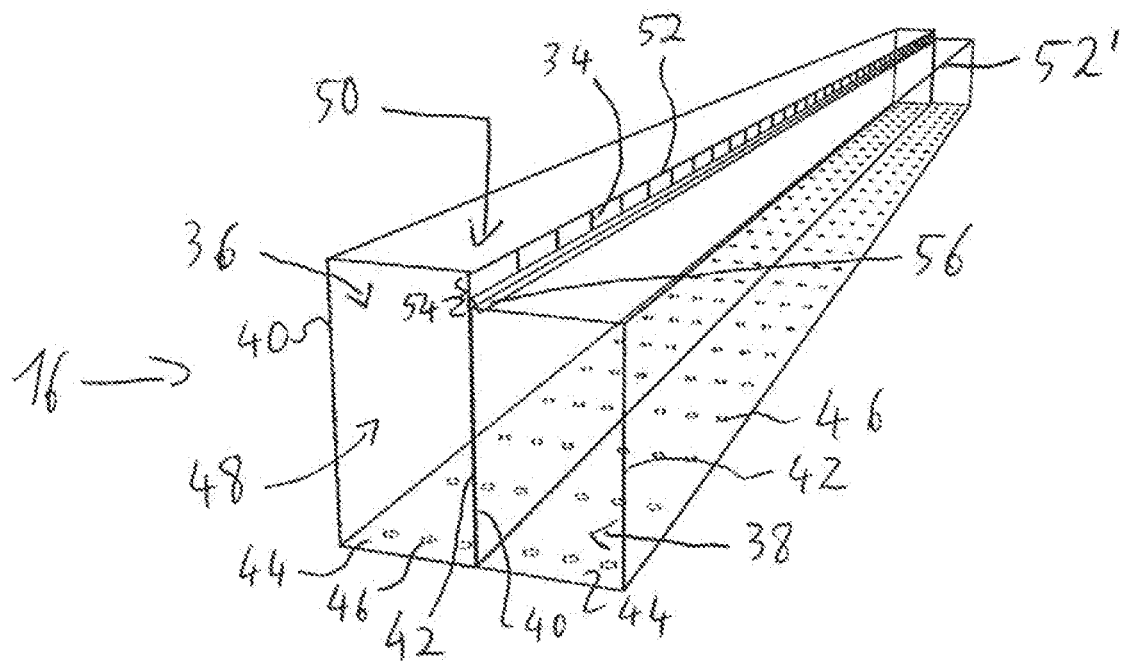
FIG. 3*a* is a schematic perspective view of a pre-distributor member of a liquid distributor in accordance with one embodiment of the present disclosure.
Figure 3B:
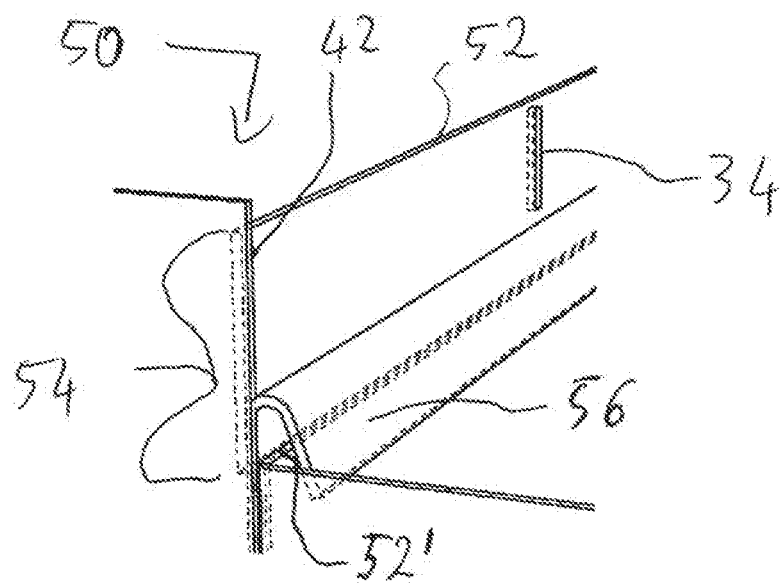
FIG. 3*b* is a enlarged view of a section of the pre-distributor member shown in FIG. 3*a*.
Figure 3C:
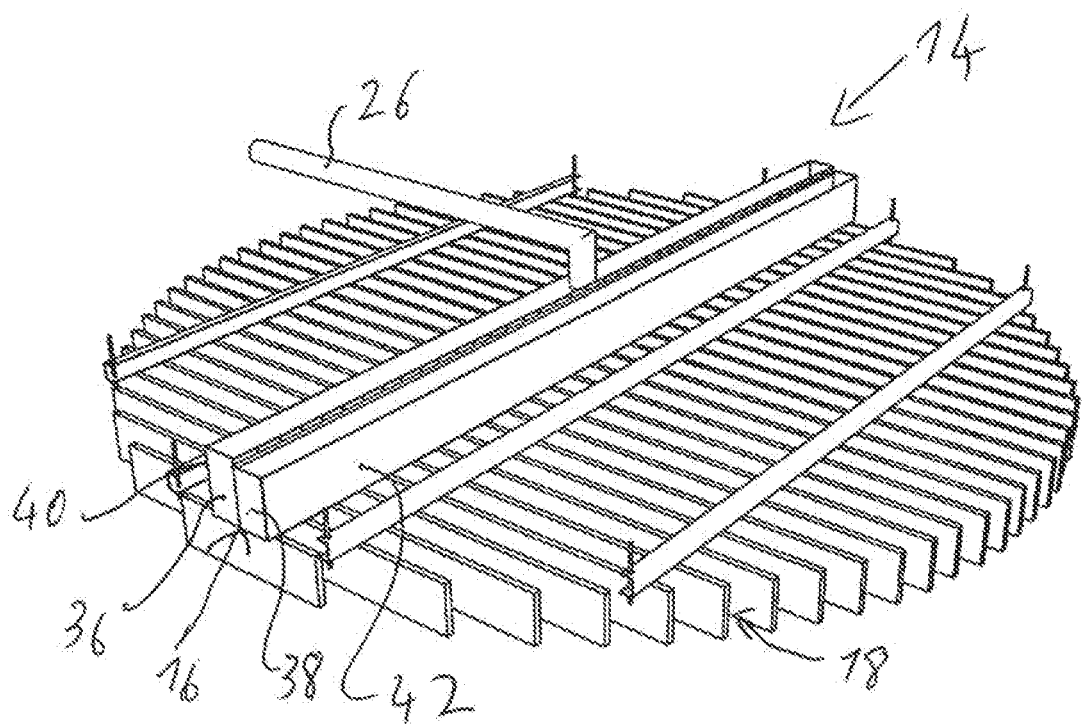
FIG. 3*c* is a schematic perspective view of a liquid distributor comprising the pre-distributor member shown in FIG. 3*a*.

In order to overcome these drawbacks, the pre-distributor member 16 of a liquid distributor in accordance with one embodiment of the present disclosure as shown in FIG. 3*a* to 3*c* comprises two troughs 36, 38, namely a first trough 36 and a second trough 38. FIGS. 3*a* and 3*b* show schematically the pre-distributor member 16, whereas FIG. 3c shows the liquid distributor 14 comprising the pre-distributor member 16 shown in FIGS. 3a and 3b as well as the distributor members 18. Each of the troughs 36, 38 comprises two side walls 40, 42, a bottom wall 44 comprising a plurality of discharge openings 46 and two front walls 48. The first trough 36 and the second trough 38 are connected with each other, for instance by riveting the second side wall 42 of the first trough 36 with the first side wall 40 of the second trough 38. The top surface 50 of both troughs 36, 38 is open. The second wall 42 of the first trough 36 is slightly lower than the first wall 40 and has several overflow slits 34. Moreover, the upper edge 52 of the second wall 42 of the first trough 36, which is interrupted by the overflow slits 34, forms several overflow edges 52. That part of the side wall 42 comprising the overflow edges 52 and the overflow slits 34 is the overflow portion 54 of the first trough 36. Slightly below the lower end of the overflow slits 34, a deflector 56 is arranged, which is connected with the overflow portion 54 formed by the second wall 42 of the first trough 36. The deflector 56 extends at an angle of more about 45° from the second side wall 42 of the first trough 36 to the second trough 38. The first and second side walls 42, 44 of the second trough 38 and thus also the upper edges 52' of the side walls are lower than those of the first trough 36.

During the operation, liquid flows from the feed line 26 as shown in FIG. 3c into the first trough 36 of the pre-distributor member 16. A part of the liquid flows through the discharge openings 46 of the first trough 36 of the pre-distributor member 16 as shown in FIGS. 3a and 3b into the troughs of the distributor members 18 as shown in FIG. 3c being arranged below the pre-distributor member 16. If the liquid load is high enough, the liquid level within the first trough reaches the lower end of the slits 34 and, if it is even higher, possibly also the upper edge 52 or overflow edges 52, respectively, of the first trough 36. Another part of the liquid flows then through the overflow slits 34 and possibly also the upper edge 52 or overflow edges 52, respectively, and from there over the deflector 56 into the second trough 38. From there liquid flows through the discharge openings 46 of the second trough 38 of the pre-distributor member 16 into troughs of the distributor members 18 as shown in FIG. 3c being arranged below the pre-distributor member. On account of the avoidance of a seal welded dividing wall as in the prior art and as shown in FIG. 2, the pre-distributor member 16 of the liquid distributor in accordance with the present disclosure is easily producible and is in particular with no or at most a minimal welding heat impact applied and no or, if at all, only simple welding equipment is required. This is due to the fact that on account of the overflow portion 54 and the at least one deflector 56 connected thereto and extending into the second trough 38, liquid flows reliably and completely without any liquid loss from the first trough 36 over the overflow portion 54 and the at least one deflector 56 into the second trough 38, even if there should be a small gap being present between both troughs 36, 38, because the one deflector 56 extends into the second trough 38 and thus over the possible small gap. Furthermore, because the pre-distributor member 16 comprises two separate troughs 36, 38, which can be easily connected within the separation device, each of the troughs 36, 38 can have the same dimensions as the whole seal welded multistage conventional pre-distributor member 17, so that the pre-distributor member 16 of the present disclosure can have a two-fold or even higher-fold width than the conventional seal welded multistage pre-distributor member 17. On account of the possibility of achieving a higher width, the pre-distributor member 16 in accordance with the present disclosure can be designed for an even broader operating range and thus at even higher liquid loads than the known seal welded multistage pre-distributor members 17. Moreover, because the troughs 36, 38 of the pre-distributor member 16 in accordance with the present disclosure can be separately from each other moved through the manway of the separating, they can be designed to have each a comparably low weight so as to be easily transported, wherein by combining a sufficient high number of troughs 36, 38 with each other to one pre-distributor member 16 nevertheless a comparably high operating range can be covered.

Figure 4:
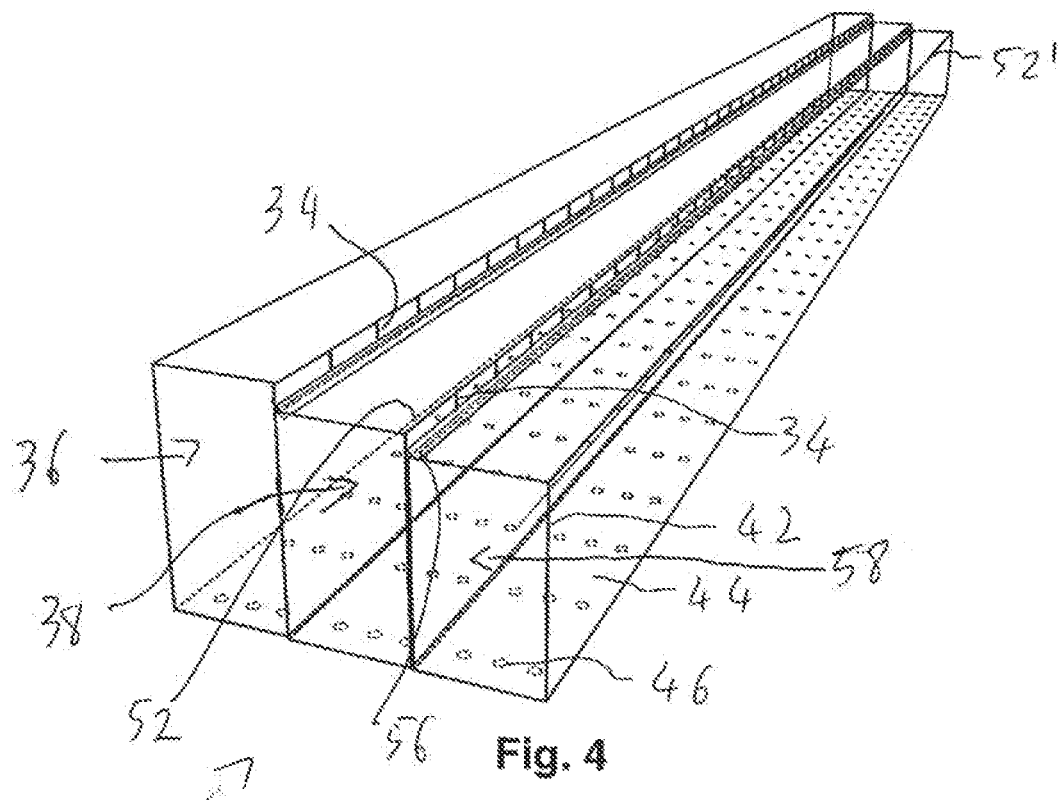
FIG. 4 is a schematic perspective view of a pre-distributor member of a liquid distributor in accordance with another embodiment of the present disclosure.

The pre-distributor member schematically shown in FIG. 4 is similar to that described above with regard to FIG. 3a to 3c, but it comprises three troughs 36, 38, 58. Each of the three troughs 36, 38, 58 comprises two side walls 40, 42, wherein the first trough 36 and the second trough 38 contact each other and are connected with each other by each one of their side walls 40, 42, and the second trough 38 and the third trough 58 contact each other and are connected with each other by each one of their side walls 40, 42, wherein each of the first trough 36 and the second trough 38 has an overflow portion 54 and at least one deflector 56 being attached to the overflow portion 54. Each of the second trough 38 and the third trough 58 has an upper edge 52, 52', wherein at least one deflector 56 attached to the overflow portion 54 of the first trough 36 extends from above the upper edge of the second trough 38 to the second trough 38 so that liquid flows from the first trough 36 over the overflow portion 54 and the at least one deflector 56 into the second trough 38, if the liquid level in the first trough 36 reaches the overflow portion 54, and wherein at least one deflector 56 attached to the overflow portion 54 of the second trough 38 extends from above the upper edge of the second trough 38 to the third trough 58 so that liquid flows from the second trough 38 over the overflow portion 54 and the at least one deflector 56 into the third trough 58, if the liquid level in the second trough 38 reaches the overflow portion 54.

Figure 5:
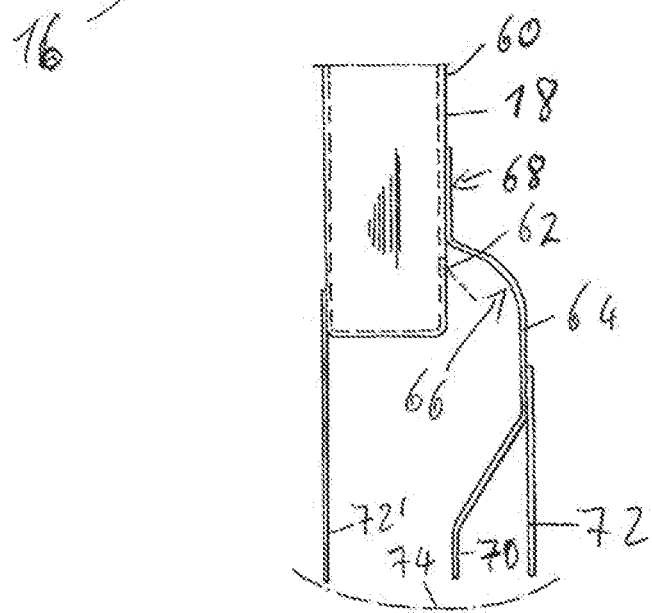
FIG. 5 is a schematic sectional view of a distributor member of a liquid distributor in accordance with another embodiment of the present disclosure.

FIG. 5 shows as a schematic sectional view one of the plurality of distributor members 18 of a liquid distributor 14 in accordance with another embodiment of the present disclosure. Accordingly, each of the distributor members 18 has the form of a trough and provides at the lower part of one of its side walls 60 a plurality of outlet opening 62. In front of the outlet openings 62, a screen 64 is arranged so that liquid jets outflowing through the outlet openings 62 impinge onto the surface of the screen 64 and are deformed thereon to thin flowing liquid films. The screen 64 has in cross-section the form of a sigmoidal curve, wherein the sigmoidal curve is curved downwardly and the sigmoidal curve has a largely constant curvature in the impinge region 66, in which the liquid jets impinge onto the surface of the screen 64. The screen 64 is affixed to the distributor member 18 at its upper end 68 and is designed at its lower end as a drip edge 70. The screen 64 further contains two skirts 72, 72'. While the first skirt 72 is affixed to the screen 64, the second skirt 72' is affixed to the liquid distributor 18. Both skirts 72, 72' allow to influence the stream of gas 20 advantageously, namely so that a stagnation zone 74 is formed beneath the distributor member 18, wherein the drip edge 70 of the screen 30 is arranged inside the stagnation zone 74. During the operation of the mass transfer column 10, liquid flows out of the outlet openings 62 in the form of liquid jets, which impinge at the impinge region 66 onto the surface of the screen 64 essentially tangentially so as to form a thin flowing liquid film, which flows down the screen 64 down to the drip edge 70. Droplets or trickles, which form at the drip edge 70, fall down onto the surface of the packing 12, which is located closely underneath the drip edge 70 of the screen 64. On account of the curvature, the liquid film is not or at least only to a small degree disturbed by ascending gas 20, since the gas 20 is guided by the screen 30 away from the thin liquid film flowing down the surface of the screen 64. On account thereof, the liquid droplets formed at the drip edge 70 fall down to the underneath packing 12 without or at least essentially without any of the droplets being carried away by the ascending gas 20.

The invention claimed is:

1. A liquid distributor for a separation device, the liquid distributor comprising:
at least one pre-distributor member, and
a plurality of distributor members,
wherein the at least one pre-distributor member is positioned above the plurality of distributor members,
wherein the at least one pre-distributor member comprises at least two troughs, each of the at least two troughs comprising a plurality of discharge openings,
wherein each two of the at least two troughs are connected with each other,
wherein a first trough of the at least two troughs has an overflow portion and at least one deflector attached to the overflow portion or a first side wall of the first trough,
wherein a second trough of the at least two troughs has an upper edge,
wherein if a liquid level in the first trough reaches the overflow portion, the at least one deflector attached to the overflow portion or the first side wall extends from above the upper edge of the second trough to the second trough so that liquid flows into the second trough from the first trough over the overflow portion or the first side wall and the at least one deflector,
the distributor members comprising a first group of distributor members arranged at least substantially in parallel to each other, each of the distributor members of the first group of distributor members having a form of a second hollow box having two second side walls, two second front walls and a second bottom wall connected with each other,
at least one of the second bottom wall and one of the two second side walls having the plurality of discharge openings, and
a top surface being opposite to the second bottom wall being open and arranged such that liquid flowing through the plurality of discharge openings of the at least two troughs of the pre-distributor member flows through the top surface into the distributor members of the first group of distributor members.

2. The liquid distributor in accordance with claim 1, wherein each of at least the first trough and the second trough has two side walls and a bottom wall with the plurality of discharge openings,
wherein the bottom walls of each of at least the first trough and the second trough are flat and essentially aligned with each other such that the bottom wall of the second trough is in a same plane as the bottom wall of the first trough or in a plane being not more than 10% of a height of a highest sidewall of the first trough below or above a plane of the bottom wall of the first trough.

3. The liquid distributor in accordance with claim 1, wherein each of at least the first trough and the second trough has two side walls and at least the first trough and the second trough contact each other and are connected with each other by each one of the two side walls of the first trough and the second trough.

4. The liquid distributor in accordance with claim 1, wherein:
any one of at least the first trough and the second trough has a form of a hollow box having two side walls, two front walls and a bottom wall connected with each other,
the bottom wall has the plurality of discharge openings,
a top surface opposite to the bottom wall is open, the bottom walls of at least the first trough and the second trough are at least substantially aligned with each other, and
the hollow box has a square, rectangular, trapezoidal, oval, polygonal or irregular cross-section.

5. The liquid distributor in accordance with claim 1, wherein the overflow portion comprises one or more selected from the group consisting of: overflow edges, overflow slits, overflow holes and combinations of two or more thereof.

6. The liquid distributor in accordance with claim 5, wherein:
the overflow portion of the first trough comprises an overflow edge,
each of at least the first trough and the second trough has two side walls,
one of the two side walls of the first trough is higher than a lower one of the two side walls of the first trough,
the overflow edge is an upper edge of the lower one of the two side walls, and
the at least one deflector is attached to the overflow edge or the lower one of the two side walls and extends at an angle of more than 0° to less than 90° from the lower one of the two side walls of the first trough to the second trough.

7. The liquid distributor in accordance with claim 6, wherein:
the first trough has one deflector, and
the deflector is attached to the overflow edge or the side wall and extends over at least 50% of a length of the overflow edge.

8. The liquid distributor in accordance with claim 5, wherein:
the overflow portion comprises a plurality of overflow slits,
each of at least the first trough and the second trough has two side walls,
the plurality of overflow slits is provided in an upper part of one of the two side walls of the first trough,
the at least one deflector is attached to the overflow portion or the first side wall such that liquid flowing through the plurality of overflow slits flows over a top surface of the at least one deflector,
the at least one deflector extends at an angle of more than 0° to less than 90° from the one of the two side walls provided with the overflow slits of the first trough to the second trough, and
the plurality of overflow slits extend from an upper edge of one of the two side walls of the first trough substantially vertically downwards.

9. The liquid distributor in accordance with claim 8, wherein:
the first trough has one deflector, and
the deflector is attached to the one of the two side walls provided with the overflow slits of the first trough and extends over at least 50% of a length of the one of the two side walls provided with the overflow slits of the first trough.

10. The liquid distributor in accordance with claim 1, wherein:
the at least one pre-distributor member comprises three troughs including the first trough, the second trough and a third trough, each of the three troughs comprising two side walls,
the first trough and the second trough contact each other and are connected with each other by each one of the two side walls of the first trough and the second trough,
the second trough and the third trough contact each other and are connected with each other by each one of the two side walls of the second trough and the third trough,
each of the first trough and the second trough has an overflow portion and at least one deflector attached to the overflow portion or one of the two side walls,
each of the second trough and the third trough has an upper edge,
if a liquid level in the first trough reaches the overflow portion, the at least one deflector attached to the overflow portion or one of the two side walls of the first trough extends from above the upper edge of the second trough to the second trough such that liquid flows from the first trough over the overflow portion and the at least one deflector into the second trough,
if a liquid level in the second trough reaches the overflow portion, the at least one deflector attached to the overflow portion or the one of the two side walls of the second trough extends from above the upper edge of the second trough to the third trough such that liquid flows from the second trough over the overflow edge and the at least one deflector into the third trough, and
the first trough has a larger height than the second trough and the second trough has a larger height than the third trough.

11. The liquid distributor in accordance with claim 1, wherein:
the liquid distributor comprises one to four pre-distributor members, and
the distributor members are arranged adjacent to each other substantially in one plane.

12. The liquid distributor in accordance with claim 1, wherein:
the liquid distributor comprises a second group of distributor members, each of the distributor members of the second group of distributor members having a form of a hollow box having two side walls, two front walls and at least one bottom wall connected with each other,
at least one of the at least one bottom wall and one of the two side walls has the plurality of discharge openings for an outflow of liquid in a form of jets, and
the top surface being opposite to the bottom wall is open and liquid flowing through the discharge openings of the distributor members of the first group of distributor members flows through the top surface into the distributor members of the second group of distributor members.

13. A column for mass transfer, the column comprising:
at least one packing, and
at least one liquid distributor in accordance with claim 1, or a reactor including one or more catalyst beds and at least one liquid distributor in accordance with claim 1 for distributing liquid above the one or more catalyst beds.

14. A method for separating at least two fluids or for distributing liquid above one or more catalyst beds of a reactor using at least one column in accordance with claim 13.

* * * * *